(12) United States Patent
Bieck et al.

(10) Patent No.: US 8,018,319 B2
(45) Date of Patent: Sep. 13, 2011

(54) FOIL-TYPE SWITCHING ELEMENT, IN PARTICULAR FOR USE IN COLLISION DETECTION SYSTEMS

(75) Inventors: Werner Bieck, Wiltingen (DE); Andreas Petereit, Schweich (DE); Christian Bour, Domprix (FR)

(73) Assignee: IEE International Electronics & Engineering S.A., Luxembourg (LU)

( * ) Notice: Subject to any disclaimer, the term of this patent is extended or adjusted under 35 U.S.C. 154(b) by 256 days.

(21) Appl. No.: 11/993,098

(22) PCT Filed: Jun. 29, 2006

(86) PCT No.: PCT/EP2006/063690
§ 371 (c)(1),
(2), (4) Date: Jul. 12, 2010

(87) PCT Pub. No.: WO2007/000471
PCT Pub. Date: Jan. 4, 2007

(65) Prior Publication Data
US 2010/0294640 A1    Nov. 25, 2010

(30) Foreign Application Priority Data
Jun. 29, 2005   (EP) .................................. 05105835

(51) Int. Cl.
*H01C 13/00* (2006.01)
*H01C 10/10* (2006.01)
(52) U.S. Cl. ............. 338/215; 338/114; 338/99; 338/47
(58) Field of Classification Search ............... 338/114, 338/99, 47; 200/86.5, 85 R, 86 R, 511–512
See application file for complete search history.

(56) References Cited

U.S. PATENT DOCUMENTS

| | | | |
|---|---|---|---|
| 4,801,771 A | 1/1989 | Mizuguchi et al. | |
| 5,695,859 A | 12/1997 | Burgess et al. | |
| 5,945,929 A * | 8/1999 | Westra | 341/34 |
| 5,986,221 A | 11/1999 | Stanley et al. | |
| 5,999,083 A * | 12/1999 | Kordecki | 338/47 |
| 6,072,130 A * | 6/2000 | Burgess | 200/86 R |
| 6,696,653 B1 * | 2/2004 | Smith et al. | 200/85 R |
| 7,068,142 B2 * | 6/2006 | Watanabe et al. | 338/47 |
| 7,187,164 B2 * | 3/2007 | Kim | 324/750.02 |

FOREIGN PATENT DOCUMENTS

DE    102 30 560    6/2004

OTHER PUBLICATIONS

International Search Report; PCT/EP2006/063690; Sep. 13, 2006.

* cited by examiner

*Primary Examiner* — Kyung Lee
(74) *Attorney, Agent, or Firm* — Cantor Colburn LLP

(57) ABSTRACT

A foil-type switching element comprises a first carrier foil and a second carrier foil arranged at a certain distance from each other by means of a spacer, which comprises one opening (18) defining an active area. An elongate resistive layer (20) is provided on the second carrier foil within the active area while elongate 5 shunt means (22) are arranged on the first miler foil within the active area and facing the resistive layer (20). The form of the opening (18) in the spacer is such that the active area generally tapers in the longitudinal direction of the elongate resistive layer (20), so that when pressure is applied on the switching element, the shunt means (22) shunt a portion of the resistive layer (20) that 10 progressively increases with pressure, from the broad end of the spacer opening (18) towards its narrow end.

17 Claims, 4 Drawing Sheets

FOIL-TYPE SWITCHING ELEMENT, IN PARTICULAR FOR USE IN COLLISION DETECTION SYSTEMS

TECHNICAL FIELD

The present invention generally relates to a foil-type switching element, which is particularly adapted for use in collision detection systems in view of pedestrian protection.

BACKGROUND ART

Recently, the automotive industry has developed solutions to protect pedestrians from serious injuries in the event of an impact with the front side of a vehicle. For example, it has been proposed to provide one or more airbags on the engine hood and/or on the windshield for deployment in the event of an impact with a pedestrian. Another safety measure for an impact with a pedestrian is for the engine hood to be inclined at an angle to catch the pedestrian.

Proper deployment of such safety measures obviously depends upon a reliable detection of the impact with a pedestrian, which also implies an unambiguous differentiation from impacts with other objects. Collision detection may thus involve different detection steps. First, a collision event has to be identified and second, it must be determined whether a pedestrian has been struck. There are several approaches for assessing a collision situation. By using pressure sensors arranged at suitable locations on the outer periphery of the vehicle, one may determine the impact location as well as the magnitude of the pressure load, which allows deciding whether measures to protect a pedestrian shall be initiated.

A collision detection system for pedestrian protection is for example described in U.S. Pat. No. 6,784,792.

It will be understood that an essential requirement for an efficient detection of impact is the use of reliable pressure sensors. The force that is to be detected by the sensor due to the impact with a pedestrian generally has a rather high magnitude and is to be measured within a very short time period. Furthermore, pressure sensors for use in pedestrian protection systems should ensure reliable operation during the vehicle service lifetime. They have to be robust with regard to operating conditions in a vehicle, e.g. they should be insensitive to electromagnetic interference. Moreover, they should be designed in such a way that their integrity can be easily verified by check routines.

Among the various types of pressure sensors, Force Sensitive Resistor (FSR) based sensors are largely used in the automotive industry for their robustness and ease of manufacture. A well-known type of FSR switching element comprises two carrier foils that are arranged at a certain distance from each other by means of a spacer having an opening defining an active area. A planar electrode is arranged in the active area on one of the carrier foils. On the other carrier foil, facing the electrode, there is a layer of semi-conductive material. When no pressure is applied on the switching element, the electrode and semiconductor material layer are maintained apart due to the spacer. If a sufficient activation pressure is applied on the sensor, the planar electrode is brought into contact with the semiconductor material layer. The contact resistance diminishes as the pressure increases.

Although such a technology has proven efficient in many applications, it is not optimal for sensing the whole pressure evolution of impacts, in particular with pedestrians. Indeed, the measuring range of such FSR-switches is too narrow and its dynamic not sufficient to detect a complete pressure pulse of high magnitude that is caused by collision with a pedestrian.

BRIEF SUMMARY OF THE INVENTION

The invention provides an improved pressure sensor that is particularly appropriate for use in pedestrian collision detection.

The present foil-type switching element comprises a first carrier foil and a second carrier foil arranged at a certain distance from each other by means of a spacer having an active area. Electrode means are arranged within the active area and resistor means are associated with the active area in such a way that, in response to an activation pressure applied on the switching element, the electrode means are mechanically actuated and cause shunting of at least part of the associated resistor means.

According to an important aspect of the invention, the active area comprises at least two regions corresponding to open portions in the spacer. These regions have different sizes and thereby determine a different activation pressure threshold for each region. The electrode means are provided in each region. The resistor means comprises respective resistors, at least one of these resistors being associated with each region, and these resistors being connected in series.

The different regions of the switching element will thus be selectively and successively actuated as soon as the pressure applied on the switching element will exceed their respective activation pressure threshold. Within each region, this will cause the mechanical actuation of the electrode means and hence the shunting of at least part of the resistor (or group of resistors) associated with that region. The successive shunting of the resistors—as the actuation pressure on the switching element increases—leads to a decrease in the total resistance of the resistive circuit formed by the serially connected resistors. This variation of resistance of the switching element is thus function of the pressure applied on the switching element and determines the electrical response of the switching element.

The design of the present switching element proves advantageous in many respects. Firstly, the use of an active area consisting of a plurality of regions, each having a different activation threshold, permits to control and broaden the measurement range of the switching element. This is of particular interest for collision detection, where the range of pressures to be measured is very broad.

Compared to known foil-type sensors based on the FSR technology, the use of electrodes configured to shunt (shorten) a resistor avoids any problems of conductivity and contact that can be encountered when using resistive (semi-conducting) material, such as e.g. printed semiconducting polymers. The present switching element therefore allows a reliable detection of contact, even at low pressures.

Another important safety criteria is the need for checking the integrity of the switching element, which is possible in the present switching element due to the serial mounting of the resistors between each region.

In a first preferred embodiment, the active area comprises contiguous regions within a single opening in the spacer, said opening having a form that tapers along a predetermined direction. The electrode means comprise first, shunt forming electrode means that are arranged on the first carrier foil in the active area. The at least one resistor associated with the active area comprises an elongate resistive layer arranged on the second carrier foil in the active area substantially along the predetermined direction, so that when an increasing activation pressure is applied on the switching element, the shunt means progressively shunt the resistive layer from the broadest region to the narrowest region of the active area.

In other words, the present invention also concerns a foil-type switching element comprising:
- a first carrier foil and a second carrier foil arranged at a certain distance from each other by means of a spacer, said spacer comprising one opening defining an active area of the switching element;
- an elongate resistive layer on said second carrier foil within said active area, said elongate resistive layer having a first end and an opposite second end;
- elongate shunt means on said first carrier foil within said active area and facing said resistive layer;
- wherein the form of said opening in said spacer is such that said active area generally tapers in the longitudinal direction of said elongate resistive layer, so that when pressure is applied on said switching element, said shunt means shunt a portion of said resistive layer that progressively increases with pressure, from the broad end of the spacer opening towards its narrow end.

In this first embodiment, there is one single spacer opening that has a specific shape, so that different regions of the active area have a different mechanical response under pressure. It will be understood that deformation of the carrier foils requires a lower actuation pressure in the broader regions of the active area than in the narrower ones; and that when an increasing pressure is applied on the switching element, deformation progresses along the tapering direction, from the broad to narrow end of the opening. Since the resistor layer and shunt electrode are also aligned in this tapering direction, the amount of resistive layer shunted increases with the activation pressure. The pressure dependent electrical response of the present switching element can be easily observed by means of a collision detection circuit.

Preferably, the opening in the spacer is generally formed as a triangle, the predetermined tapering direction being defined by a median of the triangle. Those skilled in the art will however appreciate that the tapering shape of the spacer opening can de designed at will—the triangular opening may have curved, e.g. hyperbolic, sides—to provide the desired electrical response in function of the pressure applied on the switching element.

Advantageously, the resistive layer has one terminal connected to an additional resistor in order to form a voltage divider. Although such a resistor may be part of the detection circuit, it is preferably also part of the switching element (however outside the active area). Advantageously, both the resistive layer and the additional resistor may be formed on the carrier foil, e.g. by screen or offset printing. In such a case, both the resistive layer and additional resistor are subject to the same manufacturing tolerance, and the use of a ratiometric system tends to minimise tolerance related errors. Accordingly, the switching element preferably comprises a terminal line that is connected between the resistive layer and the additional resistor for measuring the potential difference at this point by means of a detection circuit. The potential difference can be measured either with respect to the other terminal of the additional resistor or that of the elongate resistive layer. Also, if no pressure is applied, the detection of an idle voltage at this point is an indication of integrity of the sensor, since the resistors are serially mounted.

For detection of a weak activation, a terminal line may connect the elongate shunt electrode in the broadest region of the opening. Integrity of the shunt electrode may then be checked by means of another terminal line connecting the shunt electrode in the narrowest region of the active area, i.e. at its opposite end.

In a second embodiment, the switching element is designed to deliver a discrete (digital) response signal to the activation pressure. Therefore, the regions of the active area are defined by distinct openings, and for each region:
- the electrode means comprise a first electrode means on the first carrier foil within the active region;
- a second electrode means is provided on the second carrier foil within the active region, this second electrode comprising first and second electrode parts facing the first electrode means so as to be interconnected by the first electrode means when an activation pressure is applied that exceeds the respective activation pressure threshold; and
- the first and second electrode parts are connected to a respective terminal of the at least one resistor associated to a respective region.

In this second embodiment, the active area consists of a plurality of regions that are defined by distinct openings of different sizes. The openings may e.g. be circular and have different diameters. In such a switching element, the smaller the size (diameter) of the opening defining a region, the greater the activation pressure threshold. When an increasing pressure is applied, contact will establish first in the larger regions and progressively in the smaller regions, as the pressure increases.

The at least one resistor associated to a respective region is preferably outside the opening defining the region. Alternatively, the second electrode means could incorporate the respective resistor that is associated with each region. In such a case, a resistive electrode can be provided on the second carrier foil within the region in such a way that the resistive layer on this electrode is directly contacted, and thereby shunted, by the opposite first electrode means when the activation pressure reaches or exceeds the activation threshold.

As in the first embodiment, an additional resistor is preferably serially connected with the resistors associated with the active area regions, so as to form a voltage divider. A terminal line is preferably provided between this resistor and the serially mounted respective resistors associated with each region, whereby both the electrical response of the sensor and the integrity thereof can be detected.

To improve the pressure distribution over the active area and within the regions, and thereby enhance the sensor response, at least one of the first and second carrier foils may comprise a multi-layered configuration with an inner supporting foil and an outer elastic activation layer. In response to pressure acting thereon, such outer elastic activation layer is deformed in such a way that it presents a greater thickness in a central zone of each region than in a peripheral zone of each region, and thereby presses said inner supporting foil towards the other carrier foil in said central zone. The elastic activation layer may comprises at least one of a foam material, a silicon gel, a rubber like material and a fluid filled cushion.

The present invention also concerns a pressure sensing element comprising a plurality of foil-type switching elements described above. For detection of a force profile, the switching elements may be arranged in a line (forming a sensor strip). The switching elements may alternatively be arranged in an array to detect a pressure distribution over a surface.

BRIEF DESCRIPTION OF THE DRAWINGS

The present invention will now be described, by way of example, with reference to the accompanying drawings, in which.

DETAILED DESCRIPTION OF THE INVENTION

Figure 1:
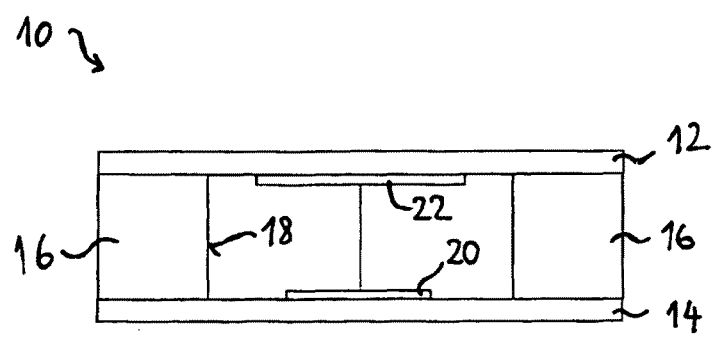
FIG. 1: is a schematic section view through a first embodiment of a pressure sensitive switching element according to the invention.

The present invention relates to a pressure sensitive foil-type switching element (hereinafter simply "pressure sensor") of the type having an electrical resistance, which varies with the amount of pressure applied thereon. As illustrated in FIG. 1, pressure sensor 10 comprises an upper, first carrier foil 12 and a lower, second carrier foil 14 arranged at a certain distance from each other by means of a spacer 16. The spacer 16 comprises at least one opening 18 (also called cut-out, recess or aperture), which defines an active area of the switching element 10. Electrode means are arranged within the active area and resistor means associated therewith in such a way that, in response to an activation pressure applied on the pressure sensor 10, the electrode means are mechanically actuated and cause shunting of at least part of the associated resistor means.

Figure 2:
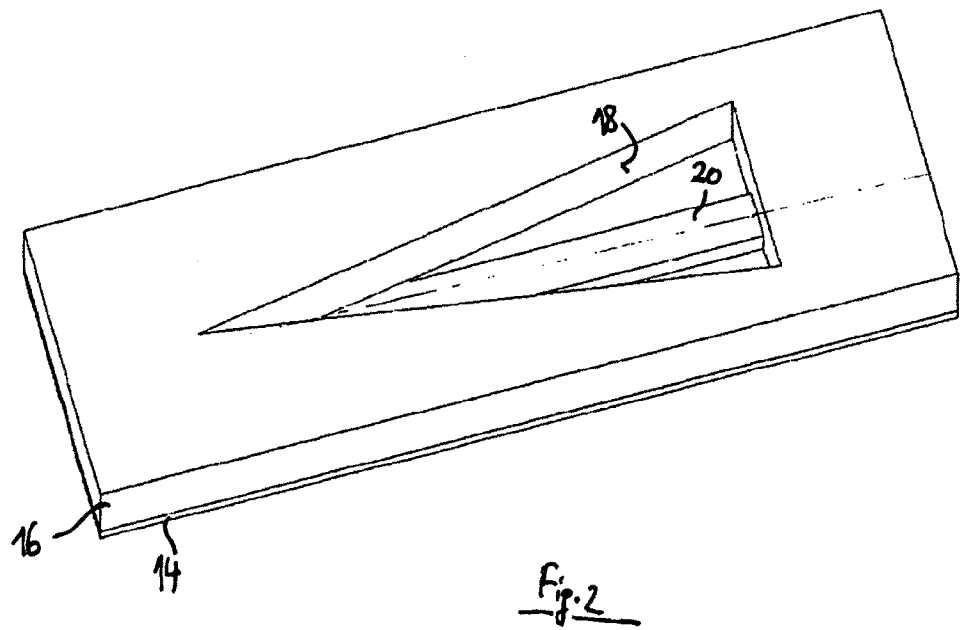
FIG. 2: is a schematic perspective view of the pressure sensor of FIG. 1, without the upper carrier foil.
Figure 3:
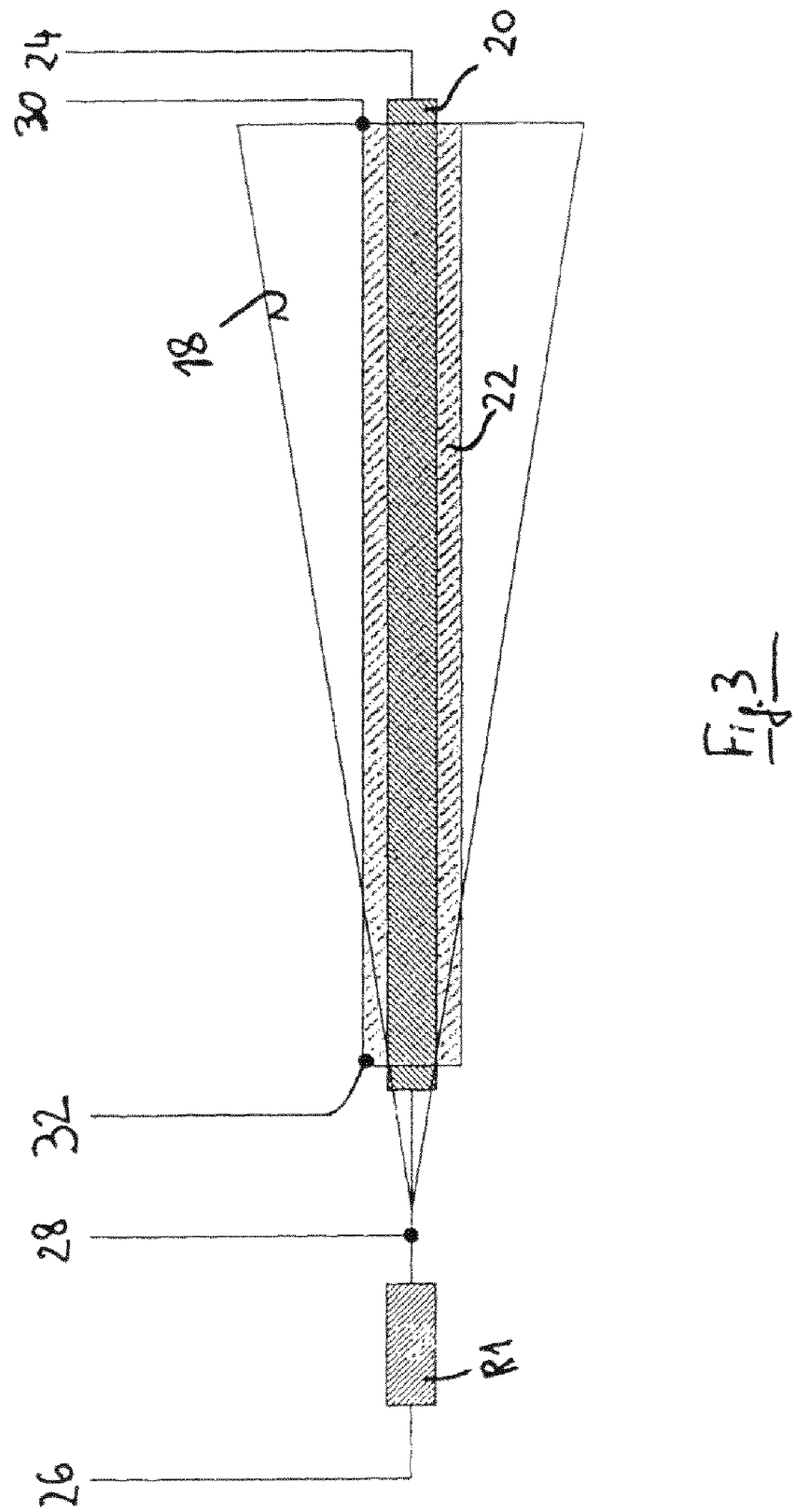
FIG. 3: is a schematic view of the circuitry in the switching element of FIG. 1.

Referring more specifically to FIGS. 2 and 3, an elongate resistive layer 20 (e.g. formed as a resistive electrode) is provided on the lower, second carrier foil 14, within the active area. Facing this elongate resistive layer 20 is an elongate electrode, preferably made of highly conductive material, which forms an elongate shunt element 22. The arrangement of the shunt electrode 22 parallel to the resistive layer 20 is shown in FIG. 3. When, due to pressure applied on the sensor 10, the shunt element 22 contacts the resistive layer 20, a portion of the latter is shunted, thereby reducing its total resistance.

It is to be appreciated that in the present embodiment, the opening 18 in the spacer 16 has a shape generally tapering in a given direction, and that the resistive layer 20 is aligned therealong. As a result, the spacer opening 18 has a form that tapers from one end of the resistive layer 20 to the other. It will be understood that with such a design, when an increasing pressure is applied on the sensor 10, the shunt element 22 will first contact the resistive layer 20 in the broader part of the active region (i.e. on the right side in FIG. 2), thereby partially shunting the resistor 20. As the activation pressure increases, the shunt element 22 will progressively come into contact with the resistive layer 20 toward the narrower side of the active area (i.e. from right to left in FIG. 2), thereby progressively shunting a larger part of the resistive layer 20 and hence further reducing the total resistance of the sensor 10.

The present design is thus equivalent to an active area having a number of contiguous regions of different sizes, while the elongate resistive layer corresponds to a number of contiguous resistors associated with these contiguous regions. As the activation pressure increase, the regions are successively actuated. The voltage measured between the longitudinal extremities of the resistive layer 20 depends on the amount of resistive layer that is shunted by the shunt element 22, and thereby depends on the activation pressure on the sensor 10.

A preferred circuitry for the sensor 10 is shown in FIG. 3. One terminal of the resistive layer 20 is preferably serially connected to another resistance R1 outside the active area in order to form a voltage divider. When a given voltage is applied between terminal lines 24 and 26, voltage variations due to the activation pressure may thus be measured by terminal line 28, either with reference to terminal 26 or 24. It is to be noted that such a ratiometric system tends to alleviate problems due to manufacturing tolerances and ageing of the resistors. In that respect, the resistive layer 20 and resistor R1 are preferably formed directly on the carrier foil by an appropriate deposition technique, as is well known in the art. A variety of techniques are available for forming resistive and/or conductive films on a substrate, however screen printing or offset printing with conductive ink is particularly preferred.

Integrity of the resistor circuit on the second carrier foil 14 can be easily checked by simple measurement of the potential at terminal line 28 in the not activated condition.

Since contact is first established in the broad region of the active area, the potential of the shunt element 22 will be about that of terminal 24. Monitoring the potential of the shunt element 22 therefore also allows detecting a weak actuation, which can be done via terminal line 30 connecting the shunt element 22 in the broadest region of the opening 18. Besides, the integrity of the shunt element 22 can be checked between terminal 30 and another terminal line 32 connecting the opposite end of the shunt element 22, i.e. in the narrowest region of the opening 18.

In this embodiment, the response signal of the pressure sensor thus depends on the activation pressure and on the shape of the spacer opening. The opening is formed as an isosceles triangle, and the resistive layer 20 and shunt electrode 22 are aligned along the triangle height. It will be understood that the electrical response of the sensor 10 can be varied, by changing the shape of the opening 18 (however keeping it generally tapering along the resistive layer 20). For example, the triangular opening 18 may have hyperbolic sides, etc.

It remains to be noted that a pressure sensing element can be formed from a plurality of pressure sensors 10, either arranged in line to measure a pressure profile, or in an array to detect a pressure distribution over an area.

Figure 5:
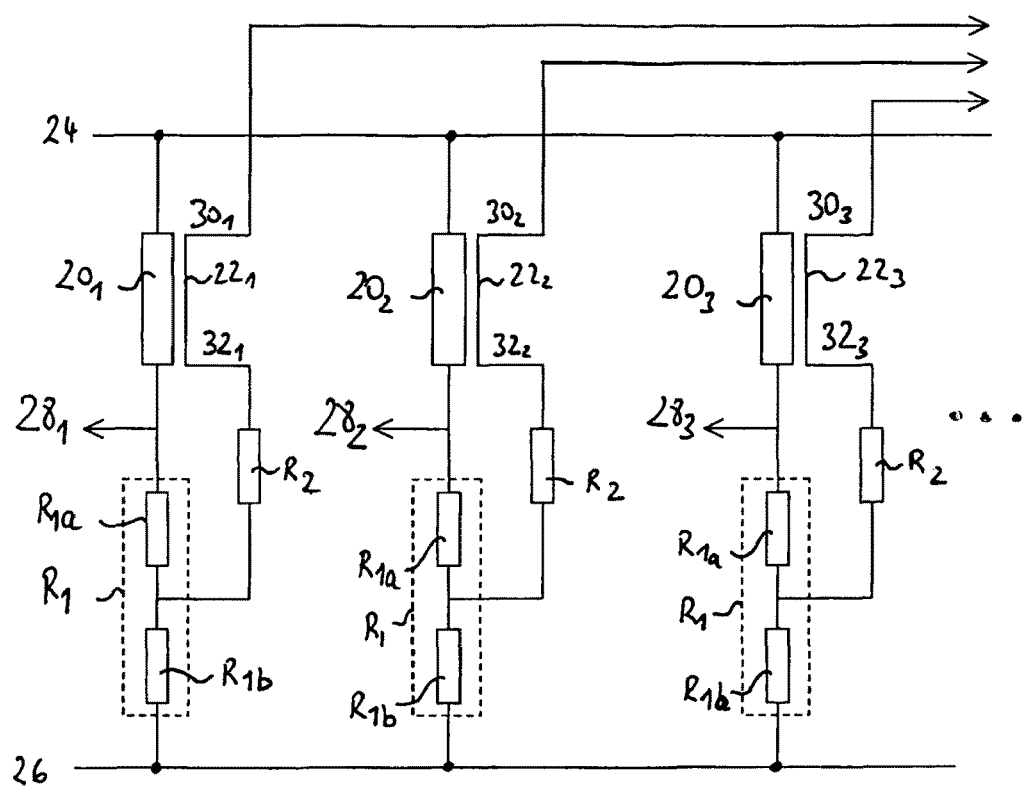
FIG. 5: is a schematic view of the connection of a plurality of pressure sensitive sensors of FIG. 1 to form a strip-shaped sensor element.

FIG. 5 schematically shows a preferred connection of a plurality of pressure sensors 10 when arranged in-line to form a sensor strip. The circuitry has been designed to minimize the amount of connections. Same reference signs as in FIG. 3 are used, however followed by a subscript index associated with the sensor number.

Resistors R1 and R2 are located close to the sensing region (active area with resistive layer $20_i$ and shunt electrode $22_i$). R2 consists of two parts (R1a and R1b); and R2 is attached to the connecting wiring of R1a and R1b. In this embodiment, it is important that R1<<R2 and $20i$<<R2. In case of no sensor activation the divided voltage of ($20i$+R1a) and R1b can be monitored on $30i$. This value indicates the correct integrity of the sensor cell. Under activated condition the voltage on $20i$ can be monitored on $30i$ because R2>>$20i$, which indicates the point of impact.

Figure 4:
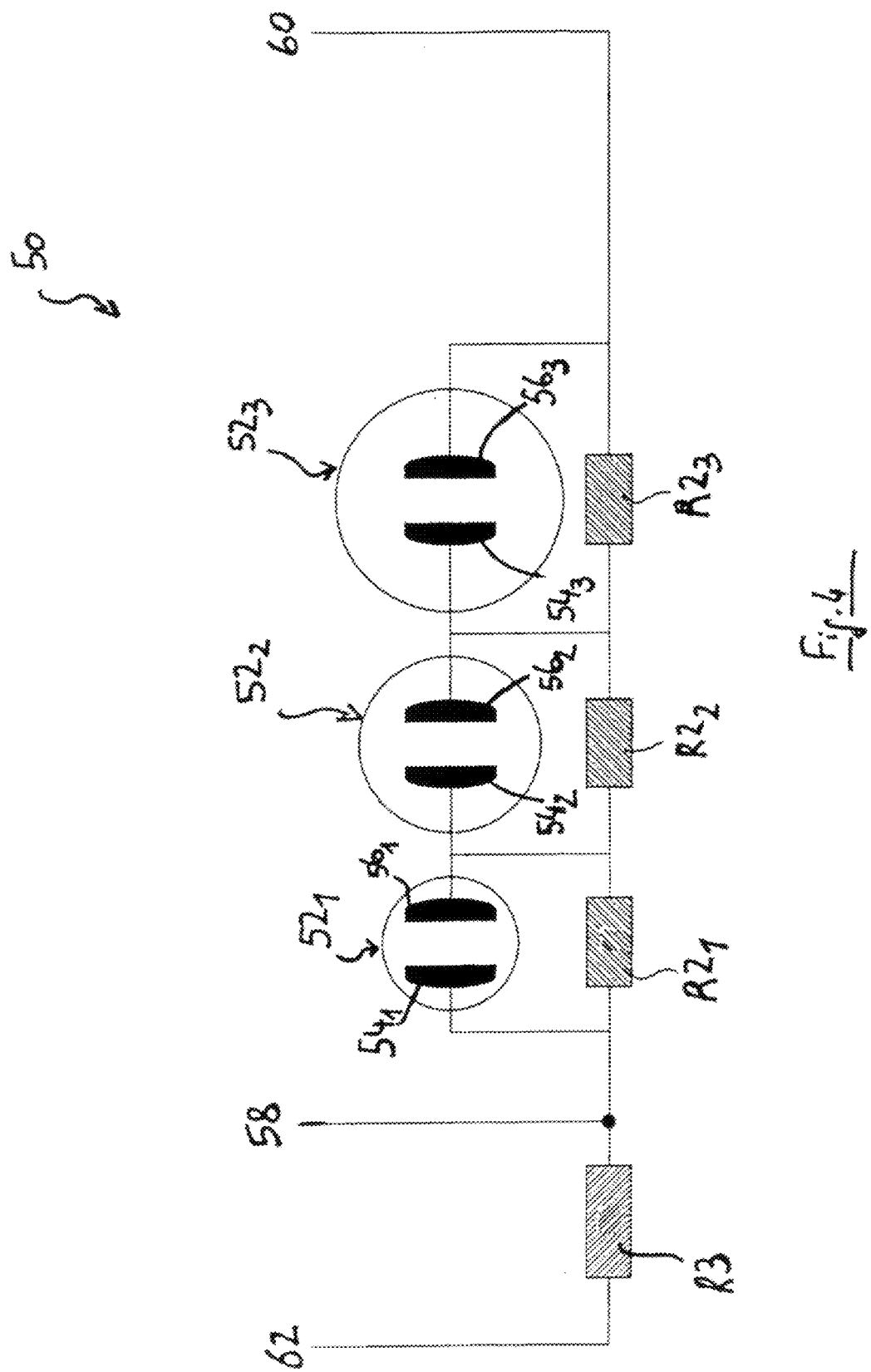
FIG. 4: is a schematic view of the circuitry of a second embodiment of a switching element of the invention, delivering a discrete response signal.

Turning now to FIG. 4, there is shown a principle diagram of another embodiment of a foil-type switching element 50 according to the present invention that generates a discrete response signal.

As for the embodiment of FIG. 4, the sensor 50 includes a pair of carrier foils separated by means of a spacer (not shown). However, the active area in the spacer comprises three different regions $52_1$, $52_2$ and $52_3$, which are each defined by a distinct opening in the spacer. Within each region of the active area, the lower carrier foil is provided with two electrode pads $54_i$, $56_i$, and a planar electrode (not shown) is arranged on the upper, first carrier foil facing these pads, so as to interconnect both pads $54_i$ and $56_i$ when a pressure exceeding the activation pressure threshold is applied.

A respective resistor $R2_i$ is associated with each region $52_i$ of the sensor's active area, and these resistors $R2_i$ are connected in series. In the present embodiment, the resistors $R2_i$ are located outside of the regions $52_i$ of the active area, and each of their terminals are connected to a respective electrode pad $54_i$, $56_i$ in the regions $52_i$. Hence, when a planar electrode in a given region $52_i$ is mechanically actuated due to the activation pressure and brought into contact with the electrode pads $54_i$ and $56_i$, the associated resistor $R2_i$ is shunted.

It is to be appreciated that the different regions are defined by openings in the spacer that have different dimensions. In FIG. 4, the three regions $52_1$, $52_2$ and $52_3$ are defined by openings of different diameter, and thereby each have a different activation pressure threshold, i.e. the pressure required to establish contact between the upper planar electrode and the respective electrode pads $54_i$, $56_i$. The smaller the diameter of the opening in the spacer, the greater the activation pressure threshold.

Hence, when an increasing pressure is applied on the sensor 50, the regions $52_i$ will be successively actuated, from right to left in FIG. 4. This implies the successive shunting of resistor $R2_3$, followed by $R2_2$ and finally $R2_1$, and thus a stepped electrical response of the sensor 50.

Since the three resistors $R2_1$, $R2_2$ and $R2_3$ are connected in series, the integrity of the sensor can easily be verified.

As for the embodiment of FIGS. 1-3, the three resistor $R2_1$, $R2_2$ and $R2_3$ are mounted in series with an additional resistor R3 to form a voltage divider. A terminal line 58 is preferably arranged at the junction for measuring the potential either with respect to terminal 60 or 62, which reflects the shunting condition of the three resistors $R2_1$, $R2_2$ and $R2_3$. Monitoring the potential at 58 in the non-actuated state is also an indication of sensor integrity.

It remains to be noted that in the above described embodiments, at least one of the carrier foils may comprise a multi-layered configuration with an inner supporting foil and an outer elastic activation layer, which in response to pressure acting thereon, is deformed in such a way that it presents a greater thickness in a central zone of each region than in a peripheral zone of each region, and thereby presses said inner supporting foil towards the other carrier foil in said central zone. Such an elastic activation layer permits distributing the actuation pressure over the surface of the active area. The provision of an elastic activation layer in a foil-type switching element is e.g. described in WO2004/053906.

The invention claimed is:

1. Foil-type switching element comprising:
a first carrier foil and a second carrier foil arranged at a certain distance from each other by means of a spacer, said spacer having an active area;
electrode means arranged within said active area and resistor means associated with said active area in such a way that, in response to an activation pressure applied on said switching element, said electrode means are mechanically actuated and cause shunting of at least part of said associated resistor means;
wherein said active area comprises at least two regions corresponding to open portions in said spacer, said regions having different sizes, thereby determining a different activation pressure threshold for each region; said electrode means are provided in each region; and said resistor means comprises respective resistors, at least one of said resistors being associated with each region, and said resistors being connected in series.

2. Foil-type switching element according to claim 1, wherein
said active area comprises contiguous regions within a single opening in said spacer, said opening having a form that tapers along a predetermined direction;
said electrode means comprise first, shunt forming electrode means that are arranged on said first carrier foil in said active area; and
said respective resistors take the form of an elongate resistive layer arranged on said second carrier foil in said active area substantially along said predetermined direction, so that when an increasing activation pressure is applied on said switching element, said shunt forming electrode means progressively shunt said resistive layer from the broadest region to the narrowest region of said active area.

3. Foil-type switching element according to claim 2, wherein said opening is generally shaped as a triangle, said predetermined direction being defined by a median of said triangle.

4. Foil-type switching element according to claim 3, wherein said triangle has straight or curved sides.

5. Foil-type switching element according to claim 2, comprising further resistor means serially connected with said elongate resistive layer.

6. Foil-type switching element according to claim 5, comprising a terminal line in-between said further resistor means and said elongate resistive layer, for measurement of the voltage by a detection circuit.

7. Foil-type switching element according to claim 2, wherein said shunt forming electrode means comprise an elongate electrode of highly conductive material arranged parallel to said elongate resistive layer.

8. Foil-type switching element according to claim 2, comprising a terminal line connecting said shunt forming electrode means in the broadest region of said active area.

9. Foil-type switching element according to claim 2, comprising a terminal line connecting said shunt forming electrode means in the narrowest region of said active area.

10. Foil-type switching element according to claim 1, wherein
said regions of said active area are defined by distinct openings;
and wherein in each region:
said electrode means comprise a first electrode means on said first carrier foil within said active region; and
a second electrode means on said second carrier foil within said active region, said second electrode comprising first and second electrode parts facing said first electrode means so as to be interconnected by said first electrode means when an activation pressure is applied that exceeds the respective activation pressure threshold;
and wherein said first and second electrode parts are connected to a respective terminal of said at least one resistor associated to a respective region.

11. Foil-type switching element according to claim 10, wherein said openings are circular and have different diameters.

12. Foil-type switching element according to claim 10, comprising further resistor means serially connected with said resistors associated with said regions.

13. Foil-type switching element according to claim 12, comprising a terminal line in-between said further resistor means and said resistors associated with said regions, for measurement of the voltage by a detection circuit.

14. Foil-type switching element according to claim 1, wherein at least one of said first and second carrier foils comprises a multi-layered configuration with an inner supporting foil and an outer elastic activation layer, which in response to pressure acting thereon, is deformed in such a way that it presents a greater thickness in a central zone of each region than in a peripheral zone of each region, and thereby presses said inner supporting foil towards the other carrier foil in said central zone.

15. Foil-type switching element according to claim 14, wherein said activation layer comprises at least one of a foam material, a silicon gel, a rubber like material and a fluid filled cushion.

16. Pressure sensing element comprising a plurality of switching elements according to claim 1, 2 or 10 arranged in a line or in an array.

17. Use of a foil-type switching element according to claim 1 or of a pressure sensing element according to claim 16, in a collision detection system of an automotive vehicle.

* * * * *